United States Patent
Santos et al.

(10) Patent No.: US 8,627,448 B2
(45) Date of Patent: Jan. 7, 2014

(54) SELECTIVE INVALIDATION OF PACKET FILTERING RESULTS

(76) Inventors: Jose Renato Santos, San Jose, CA (US);
Yoshio Turner, San Francisco, CA (US);
John Wickeraad, Cupertino, CA (US)

( * ) Notice: Subject to any disclaimer, the term of this patent is extended or adjusted under 35 U.S.C. 154(b) by 573 days.

(21) Appl. No.: 12/938,090

(22) Filed: Nov. 2, 2010

(65) Prior Publication Data

US 2012/0110656 A1    May 3, 2012

(51) Int. Cl.
*G06F 9/00* (2006.01)

(52) U.S. Cl.
USPC ............................................. 726/13

(58) Field of Classification Search
USPC ............................................. 726/13
See application file for complete search history.

(56) References Cited

U.S. PATENT DOCUMENTS

| | | | |
|---|---|---|---|
| 6,173,364 B1 * | 1/2001 | Zenchelsky et al. ........ | 711/118 |
| 7,509,300 B2 | 3/2009 | Sahni et al. | |
| 7,624,126 B2 | 11/2009 | Pizzo et al. | |
| 7,633,944 B1 | 12/2009 | Chang et al. | |
| 2003/0065812 A1 * | 4/2003 | Beier et al. ................ | 709/236 |
| 2003/0120622 A1 | 6/2003 | Nurmela et al. | |
| 2005/0268335 A1 * | 12/2005 | Le et al. ..................... | 726/13 |
| 2008/0192754 A1 | 8/2008 | Ku et al. | |
| 2009/0217341 A1 | 8/2009 | Sun et al. | |
| 2010/0067535 A1 | 3/2010 | Ma et al. | |

* cited by examiner

*Primary Examiner* — Teshome Hailu (57) ABSTRACT

Example embodiments relate to selective invalidation of packet filtering cache results based on rule priority. In example embodiments, a network node determines whether a rule identifier included in a cache entry of a cache of results of a packet filtering rule set is of a higher priority than a highest priority rule corresponding to a rule set version identifier included in the cache entry. If so, the network node may apply an action included in the cache entry.

15 Claims, 5 Drawing Sheets

SELECTIVE INVALIDATION OF PACKET FILTERING RESULTS

BACKGROUND

When processing network traffic, a network node may perform packet filtering to apply policies specified by a network administrator to provide an additional layer of security in the network. For example, a packet filter may selectively forward or drop packets based on the source address, destination port, protocol, or another property of each packet. Due to its simplicity, packet filtering provides an inexpensive yet effective method for policing incoming and outgoing network traffic.

In order to accelerate the packet filtering process and minimize power consumption due to unnecessary processing, many packet filters include a cache that maintains the results of recently-applied packet filtering rules. In this manner, the packet filter may access a cached result for a particular packet, rather than traversing the entire set of filtering rules to determine which rule to apply. To ensure that the correct packet filtering rule is applied, however, packet filters generally implement a time-consuming, expensive process for removing and replacing outdated results in the cache.

BRIEF DESCRIPTION OF THE DRAWINGS

The following detailed description references the drawings, wherein.

DETAILED DESCRIPTION

As detailed above, a network node that implements packet filtering may utilize a cache of packet filtering results to accelerate the filtering process. However, in order to accurately process each packet according to a matching packet filtering rule, the network node must ensure that the cache contains an up-to-date filtering result for each packet. As a result, when the packet filtering rules change, the network node must ensure that the result cached for a given packet has not also changed.

To address this issue, example embodiments disclosed herein provide for a packet filtering process that ensures that the cache contains updated results by selectively invalidating cached results using a priority assigned to each packet filtering rule. For example, a network node may maintain a list of version identifiers of a packet filtering rule set and, for each version identifier, store a value indicating the highest priority rule modified for that version of the rule set. Then, upon receipt of a packet, the network node may determine a version identifier for the cached result and also determine a priority of the rule corresponding to the cached result. The network node may then determine whether the priority of the corresponding rule is of a higher priority than the highest priority rule modified for that version of the packet filtering rule set. If so, the network node may determine that the cached result has not changed and therefore process the packet according to the cached rule. Otherwise, the network node may ignore the cached rule and access the packet filtering rules to obtain an updated filtering result for the packet.

In this manner, because a result of each cache invalidation decision is based on the priority of individual rules, example embodiments provide for application and updating of cached results with a fine granularity. As a result, example embodiments minimize the processing required to update cache entries, while still ensuring that the most recent packet filtering decision is applied to each packet. Additional embodiments and applications of such embodiments will be apparent to those of skill in the art upon reading and understanding the following description.

Figure 1:
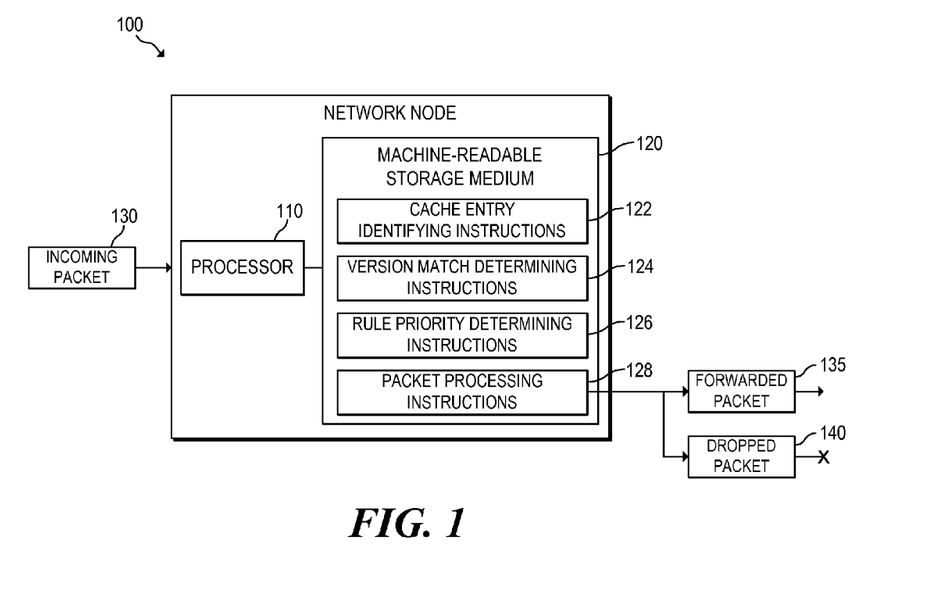
FIG. 1 is a block diagram of an example network node for applying a filtering rule included in a cache entry to a packet based on a highest priority rule modified for a corresponding version of a packet filtering rule set.

Referring now to the drawings, FIG. 1 is a block diagram of an example network node 100 for applying a filtering rule included in a cache entry to a packet based on a highest priority rule modified for a corresponding version of a packet filtering rule set. Network node 100 may be, for example, a router, a switch, a bridge, a dedicated packet filter, or any other hardware device suitable for receipt, processing, and transmission of packets. In the embodiment of FIG. 1, network node 100 includes processor 110 and machine-readable storage medium 120.

Processor 110 may be one or more central processing units (CPUs), semiconductor-based microprocessors, and/or other hardware devices suitable for retrieval and execution of instructions stored in machine-readable storage medium 120. Processor 110 may fetch, decode, and execute instructions 122, 124, 126, 128 to implement the packet processing procedure described in detail below. As an alternative or in addition to retrieving and executing instructions, processor 110 may include one or more integrated circuits (ICs) or other electronic circuits that include a number of electronic components for performing the functionality of one or more of instructions 122, 124, 126, 128. For example, processor 110 may be a Field-Programmable Gate Array (FPGA), an Application-Specific Integrated Circuit (ASIC), a hardware state machine, or other hardware device.

Machine-readable storage medium 120 may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage drive, a Compact Disc Read-Only Memory (CD-ROM), and the like.

As described in detail below, machine-readable storage medium 120 may be encoded with a series of executable instructions 122, 124, 126, 128 for filtering packets based on a packet filtering rule set and a corresponding set of cached results. Instructions 122, 124, 126, 128 may be executed by network node 100 in processing each incoming packet 130 to determine whether to apply a cached result included in the cache or, alternatively, whether to access the entire packet filtering rule set to determine a matching rule.

The packet filtering rule set may specify an action to be taken for a given packet (e.g., forwarding or dropping the packet) when the packet matches a key pattern of the rule (e.g., a pattern based on an Internet Protocol (IP) source or destination address, a Media Access Control (MAC) address, a Transmission Control Protocol (TCP) port, and/or a Virtual Local Area Network (VLAN) identifier). For example, a key pattern may specify a number of fields and a value or wildcard for each field that is used to determine whether an incoming packet matches the particular key pattern. As a specific example, a filtering rule set may be based on the following fields: <destMAC, sourceMAC, destIP, sourceIP> and a specific key pattern in the rule set may be: <*, *, 192.168.0.1, *>. This pattern may match any packet with a destination IP address of 192.168.0.1 and any other values for the destination and source MAC addresses and the source IP address.

The packet filtering rule set may also include a priority for each rule, such that, when multiple keys match a packet, the highest priority matching rule is applied. The priority of the rule may be represented by an identifier associated with each rule. For example, each rule may be identified by an integer or other alphanumeric identifier, such that the ordering of the identifiers represents the priority of the rules. An example set of fields included in the packet filtering rule set is shown in the following table:

TABLE 1

Example Fields of a Packet Filtering Rule Set

| Rule Identifier | Key Pattern | Action |
| --- | --- | --- |

To minimize expensive accesses to the packet filtering rule set, the cache may store a number of results for recently-matched packets, such that the cached action is applied, for example, upon receipt of subsequent packets in the same flow. Each cache entry may include, for example, a key value used to determine whether a packet matches the entry, the action and rule identifier from the matching packet filtering rule, and a version identifier that identifies a version of the packet filtering rule set when the cache entry was created. The key value may include the packet's values for each field identified in the matching key pattern. Thus, continuing with the previous example, a key value that matches the pattern <*, *, 192.168.0.1, *> would contain the source and destination MAC addresses, the destination IP address (192.168.0.1), and the source IP address. An example set of fields included in the cache is shown in the following table:

TABLE 2

Example Fields of a Packet Filtering Cache

| Key | Action | Rule Identifier | Version ID |
| --- | --- | --- | --- |

Machine-readable storage medium 120 may include cache entry identifying instructions 122, which may first attempt to identify a cache entry that corresponds to an incoming packet 130. Identifying instructions 122 may identify the entry in cache by determining a key value for the incoming packet 130 and searching for an entry in the cache that includes a matching key. For example, the key stored in the cache for a given packet may be the specific set of values that match a corresponding pattern specified in the packet filtering rule set.

Machine-readable storage medium 120 may also include version match determining instructions 124, which, when a matching cache entry is located, may determine whether a rule set version identifier included in the cache entry for incoming packet 130 matches a current version of the packet filtering rule set. The current version of the set of rules may be, for example, an integer or alphanumeric value that is incremented or otherwise increased each time the packet filtering rule set is modified. As detailed above, each cache entry may store a version identifier that represents the current version of the packet filtering rule set when the cache entry was created. Thus, determining instructions 124 may determine whether the matching cache entry corresponds to the most recent version of the packet filtering rule set. As described below, if the version identifier matches the current version, packet processing instructions 128 may then apply the cached action.

In addition, machine-readable storage medium 120 may include rule priority determining instructions 126, which may first determine the rule identifier included in the cache entry that matches incoming packet 130. Determining instructions 126 may then determine the rule set version identifier included in the cache entry and, using the version identifier, determine a highest priority rule that was modified for that version of the packet filtering rules. Determining instructions 126 may then determine whether the rule identifier included in the cache entry is of a higher priority than the highest priority rule modified for the identified version of the packet filtering rule set. As described below, if the rule identifier included in the cache entry is of a higher priority, then packet processing instructions 128 may apply the cached action.

As a specific example, the following table illustrates a number of rule set version identifiers and a highest priority rule modified for each version, assuming that the rule identifiers are ordered beginning with a highest priority value of "1" and the current version of the packet filtering rule set is "4." As detailed below in connection with rule set update engine 245 of FIG. 2 and method 500 of FIG. 5, this table may be updated each time the packet filtering rule set is modified to maintain an indication of rule priorities for each version that are still valid.

TABLE 3

Example Table of Highest Priority Modified Rules

| Version ID | Highest Priority Rule |
| --- | --- |
| 1 | 105 |
| 2 | 110 |
| 3 | 125 |

Continuing with the example, suppose the version identifier included in the matching cache entry for incoming packet 130 is "2" and the rule identifier corresponding to the entry is "90." Upon receipt of incoming packet 130, determining instructions 126 may access Table 3 and determine that the highest priority rule modified for version 2 of the packet filtering rule set is "110." Accordingly, because 90 is less than 110 (and the cached rule is therefore of a higher priority), determining instructions 126 may determine that the result cached for packet 130 is still valid despite the subsequent modification of the packet filtering rules in versions 3 and 4.

Packet processing instructions 128 may process incoming packet 130 according to the determinations made by determining instructions 124, 126. For example, if version match determining instructions 124 determine that the rule set version identifier matches the current version of the packet filtering rule set or rule priority determining instructions 126 determine that the cached rule identifier is of a higher priority than the highest priority rule modified for the identified version of the packet filtering rule set, packet processing instructions 128 may apply the cached action for the packet.

Alternatively, when the rule set identifier does not match the current version and the cached rule identifier is of an equal or lower priority than the highest priority rule modified for the identified version, packet processing instructions 128 may determine a matching rule from the packet filtering rule set and update the cache accordingly. Thus, processing instructions 128 may first access the packet filtering rule set to identify a rule with a matching key pattern and a corresponding action for the packet, which, in some embodiments, may be identified as the highest priority rule with a key pattern that matches the fields of incoming packet 130. Processing instructions 128 may then identify an available entry in the cache and insert a cached result corresponding to the identified rule in the cache. The cached result may include, for example, the key for the packet (e.g., the set of fields that match the key pattern), the matching action, the identifier of the matching rule, and the current version of the packet filtering rule set.

Regardless of whether packet processing instructions 128 utilize the cached result or identify an updated result from the set of filtering rules, processing instructions 128 may then apply the determined action to the packet. Thus, processing instructions 128 may forward the packet, as represented by forwarded packet 135, or drop the packet, as represented by dropped packet 140.

Figure 2:
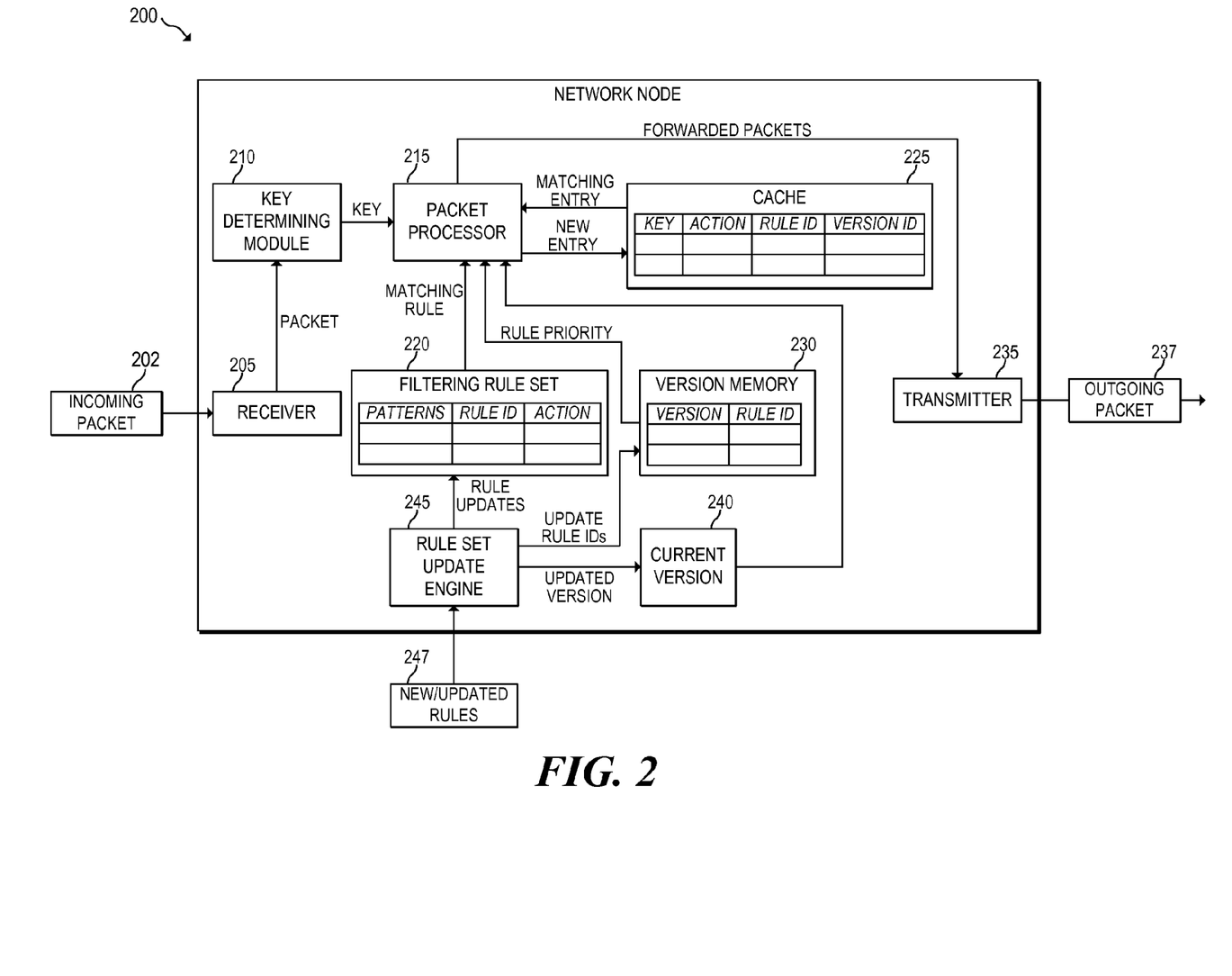
FIG. 2 is a block diagram of an example network node for applying a filtering rule result included in a packet filtering cache based on access to a version memory and a current version of the packet filtering rule set.

FIG. 2 is a block diagram of an example network node 200 for applying a filtering rule result included in a packet filtering cache 225 based on access to a version memory 230 and a current version 240 of the packet filtering rule set 220. As detailed below, network node 200 may include a plurality of components for receiving and processing an incoming packet 202 to apply a rule specified in packet filtering rule set 220.

In the following description, reference is made to a number of components 205-245 of network node 200. The components 205-245 may individually or collectively comprise hardware, executable instructions encoded on a machine-readable storage medium, or a combination thereof. For example, one or more of components 205-245 may be, alone or in combination, a CPU, a microprocessor, an FPGA, an ASIC, a machine-readable storage medium, or other electronic circuitry. Various arrangements and configurations of the functionality of components 205-245 will be apparent to those of skill in the art.

Receiver 205 may be, for example, a hardware device suitable for receiving incoming packets 202 over a corresponding communication channel. For example, receiver 205 may be a network interface card, line card, or other device that includes a number of interfaces for receiving packetized data from a number of corresponding sources.

Key determining module 210 may receive a packet from receiver 205 and, in response, determine a key used in identifying a matching entry in cache 225. For example, key determining module 210 may extract one or more fields from incoming packet 202, such as a source or destination IP address, source or destination UDP or TCP port, a VLAN identifier, or any other field or fields. As another example, key determining module 210 may extract one or more fields and, using these fields, compute a key using a hash function or other mathematical function that generates a key for each input value.

Packet processor 215 may receive a key corresponding to incoming packet 202 and, in response, access cache 225 to determine whether cache 225 includes an entry corresponding to the key of incoming packet 202. For example, packet processor 215 may determine whether the fields extracted from incoming packet 202 match the fields contained in an entry in cache 225. If so, packet processor 215 may retrieve the values included in the matching entry in cache 225.

Packet processor 215 may then determine the current version of packet filtering rule set 220 based on an access of current version 240. Next, packet processor 215 may determine whether the rule set version identifier included in the retrieved entry of cache 225 is equal to the current version of packet filtering rule set 220, as indicated by current version 240.

Packet processor 215 may then determine the version identifier stored in the matching cache entry and, based on this value, determine a highest priority rule modified for that version of packet filtering rule set 220 by accessing the corresponding entry in version memory 230. Next, packet processor 215 may determine whether the rule identifier included in the cache entry is of a higher priority than the highest priority rule stored in version memory 230 for the rule set version identifier included in the matching cache entry. For example, when the rule identifiers are integers and a lower number indicates a higher priority, packet processor 215 may determine that the rule identifier included in the cache entry is of a higher priority when it is less than the highest priority rule stored in version memory 230.

When the rule set version identifier included in the entry from cache 225 is equal to current version 240 or the rule identifier included in the cache entry is of a higher priority than the highest priority rule modified for the identified version, packet processor 215 may apply the action included in the cache entry to incoming packet 202. Thus, when the action in the cache entry indicates that packet 202 is to be forwarded, packet processor 215 may instruct transmitter 235 to output packet 202 as outgoing packet 237. Alternatively, when the action in the cache entry indicates that packet 202 is to be dropped, packet processor 215 may take no further action, such that packet 202 is not forwarded.

On the other hand, when a matching entry for incoming packet 202 is not located in cache 225, packet processor 215 may determine an appropriate action for incoming packet 202 by accessing packet filtering rule set 220. Packet processor 215 may also access packet filtering rule set 220 to determine the appropriate action when the rule set version identifier included in the matching entry is not equal to current version 240 and the rule identifier included in the cache entry is of an equal or lower priority than the rule priority retrieved from version memory 230.

In determining the appropriate action based on an access of packet filtering rule set 220, packet processor 215 may first access packet filtering rule set 220 to identify a matching rule and the corresponding action for incoming packet 202 based, for example, on comparison of the key value determined by key determining module 210 to a key pattern of the entries in rule set 220. Packet processor 215 may then apply the determined action to incoming packet 202, either forwarding packet 202 to transmitter 235 or dropping the packet.

In addition, to accelerate processing of subsequent packets belonging to the same flow as packet 202, packet processor 215 may also generate a new cache entry for packet 202. Thus, packet processor 215 may locate an available entry in cache 225 and insert a cached result for packet 202 into the available entry. For example, packet processor 215 may insert a cached result into cache 225 including the key value for packet 202, the determined action, the identifier of the matching rule from packet filtering rule set 220, and the current version 240 of packet filtering rule set 220.

Packet filtering rule set 220 may store a set of rules used to selectively forward or drop packets received in network node 200. For example, the rules may be specified by a network administrator to police the traffic passing through network node 200 based on properties of each flow. As illustrated, packet filtering rule set 220 may store, for each entry, a key pattern specifying when a packet matches the entry, a rule identifier that uniquely identifies the particular rule, and an action to be taken when a particular packet includes a set of fields matching the key pattern field. In some embodiments, the rule identifier may identify the priority of the rule. For example, the rules may be ordered from a highest priority rule to a lowest priority rule based on an integer rule identifier assigned to each rule. In such implementations, the highest priority rule may be identified as rule "1," with a number of lower priority rules starting with identifier "2."

Cache 225 may store a plurality of cache entries, each corresponding to a particular rule included in packet filtering rule set 220. Each entry in cache 225 may include, for example, a rule identifier of the corresponding packet filtering rule and a rule set version identifier that identifies a version of packet filtering rule set 220 when the cache entry was created. Each entry may also include a key value specifying the fields of a packet that match the key pattern of the corresponding rule. In addition, each entry may include an action to be taken when packet processor 215 determines that the cached rule is to be applied.

Version memory 230 may store a highest priority rule modified for each of a plurality of rule set identifiers. For example, version memory 230 may maintain a listing of each version identifier of packet filtering rule set 220 and, for each version identifier, store a corresponding rule priority. As detailed below, rule set update engine 245 may maintain version memory 230, such that each entry in version memory 230 indicates a highest priority rule modified for the corresponding version of packet filtering rule set 220 that remains valid after subsequent modifications of packet filtering rule set 220.

Transmitter 235 may be, for example, a hardware device suitable for transmitting outgoing packets 237 over a corresponding communication channel. For example, transmitter 235 may be a network interface card, line card, or other device that includes a number of interfaces for transmitting packetized data to a number of corresponding destinations. In some embodiments, receiver 205 and transmitter 235 may be components of the same hardware device.

Current version 240 may identify a current version of packet filtering rule set 220 and, as detailed above, may be accessed by packet processor 215 when processing an incoming packet 202. For example, current version 240 may be an integer or other alphanumeric value that is incremented or otherwise increased each time packet filtering rule set 220 is modified.

Rule set update engine 245 may manage the process for applying changes to packet filtering rule set 220 based on receipt of new and/or updated rules 247. As an example, a network administrator may desire to insert one or more new rules into packet filtering rule set 220 and/or modify a rule priority, key pattern, and/or action of one or more existing rules. Upon receipt of rules 247, rule set update engine 245 may apply the modifications of packet filtering rule set 220, thereby updating rule set 220 to a new version.

Rule set update engine 245 may also execute a procedure to update version memory 230. For example, rule set update engine 245 may first determine an identifier of a highest priority rule modified for current version 240 of packet filtering rule set 220. Rule set update engine 245 may then insert a new entry into version memory 230, setting the version identifier of the entry to current version 240 and the rule identifier of the entry to the highest priority rule modified for current version 240.

Finally, rule set update engine 245 may update the highest priority rule stored in version memory 230 for each corresponding version such that no value in version memory 230 identifies a rule of a lower priority than the highest priority rule modified for the new version. For example, rule set update engine 245 may identify each entry in version memory 230 for which the stored rule priority is of a lower priority than the highest priority rule modified for current version 240 and, for these entries, replace the stored rule priority with the identifier of the highest priority rule modified for current version 240. In this manner, rule set update engine 245 may modify version memory 230 as necessary to ensure that version memory 230 identifies, for each version, a rule priority for which cached results are still valid despite subsequent modifications of packet filtering rules 220. After updating version memory 230 in this manner, rule set update engine 245 may increment or otherwise increase current version 240 to a value corresponding to the new version.

Figure 3:
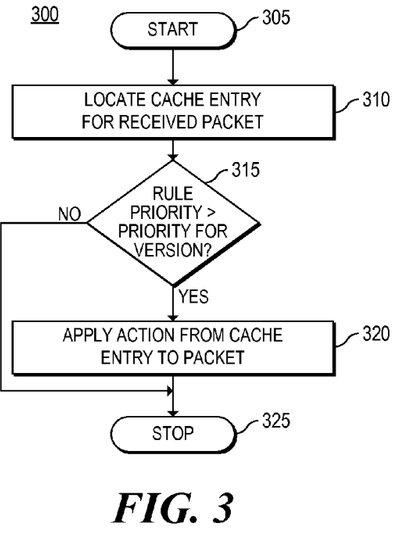
FIG. 3 is a flowchart of an example method for applying a packet filtering rule result included in a cache entry for a packet based on a highest priority rule modified for a corresponding version of the packet filtering rule set.

FIG. 3 is a flowchart of an example method 300 for applying a packet filtering rule result included in a cache entry for a packet based on a highest priority rule modified for a corresponding version of the packet filtering rule set. Although execution of method 300 is described below with reference to network node 100, other suitable components for execution of method 300 will be apparent to those of skill in the art, such as network node 200 of FIG. 2. Method 300 may be implemented in the form of executable instructions stored on a machine-readable storage medium, such as storage medium 120, and/or in the form of electronic circuitry.

Method 300 may start in block 305 and proceed to block 310, where network node 100 may attempt to locate, for a received packet, a cache entry in a cache of packet filtering results of a packet filtering rule set. For example, network node 100 may determine a key of the received packet (e.g., a number of fields of the packet) and attempt to locate an entry in the cache corresponding to this key.

Assuming that network node 100 locates a cache entry for the received packet, method 300 may proceed to block 315. In block 315, network node 100 may first determine the rule identifier and the rule set version identifier included in the cache entry. Network node 100 may then determine a highest priority rule modified for the corresponding rule set version identifier. After determining these values, network node 100 may determine whether the rule identifier is of a higher priority than the highest priority rule modified for the corresponding rule set version identifier. If so, method 300 may proceed to block 320, where network node 100 may apply the action included in the cache entry to the received packet. Otherwise, method 300 may proceed to block 325, where method 300 may stop.

Figure 4A:
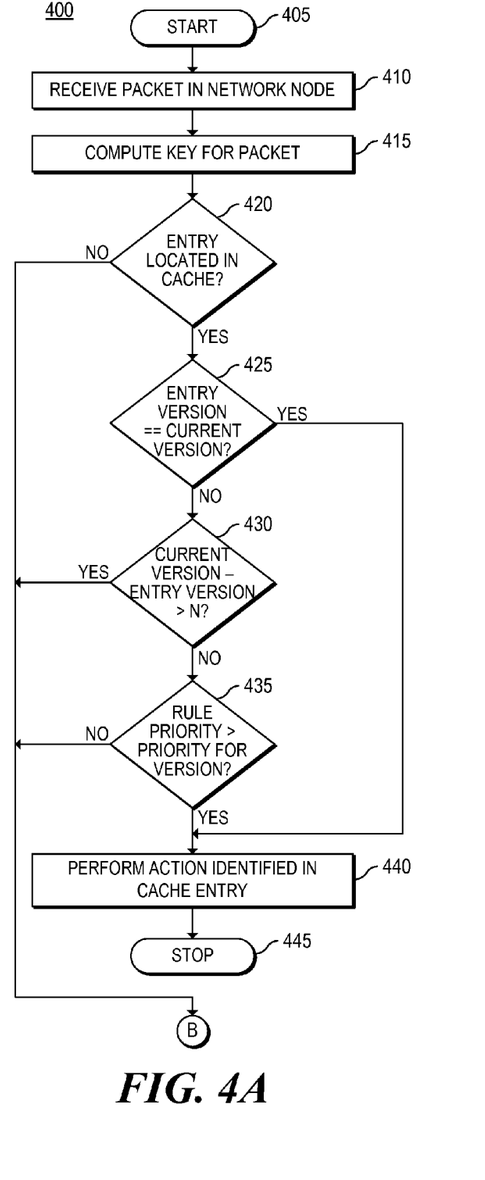
FIGS. 4A & 4B are flowcharts of an example method for processing a received packet using a packet filtering cache based on a current packet filtering rule set version and a highest priority rule modified for a corresponding version of a packet filtering rule set.
Figure 4B:
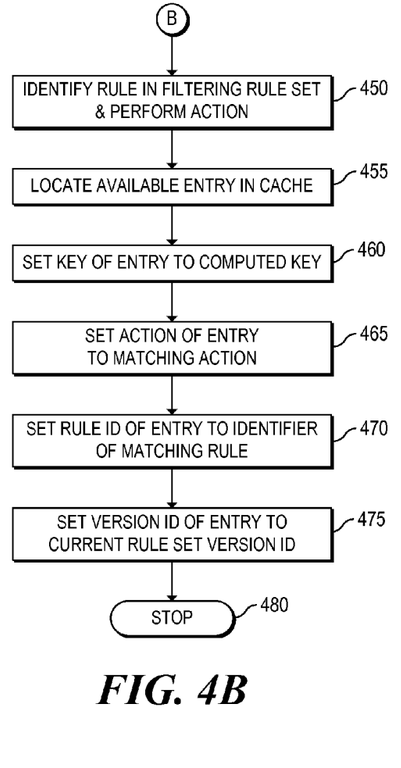

FIGS. 4A & 4B are flowcharts of an example method 400 for processing a received packet 202 using a packet filtering cache 225 based on a current packet filtering rule set version 240 and a highest priority rule modified for a corresponding version of a packet filtering rule set 220. Although execution of method 400 is described below with reference to the components of network node 200, other suitable components for execution of method 400 will be apparent to those of skill in the art. Method 400 may be implemented in the form of executable instructions stored on a machine-readable storage medium and/or in the form of electronic circuitry.

Method 400 may start in block 405 and proceed to block 410, where receiver 205 of network node 200 may receive an incoming packet 202. Method 400 may then proceed to block 415, where key determining module 210 may determine a key for the packet 202 by extracting one or more fields from packet 202 and, in some embodiments, computing a hash value of the one or more fields.

Method 400 may then proceed to block 420, where packet processor 215 may determine whether an entry corresponding to packet 202 is included in cache 225. For example, packet processor 215 may determine whether the key determined in block 415 is included in an entry in cache 225. If the key is not located in cache 225, method 400 may proceed to block 450, described below in connection with FIG. 4B. Otherwise, if the key is located in an entry in cache 225, method 400 may proceed to block 425.

In block 425, packet processor 215 may determine whether the version identifier included in the matching cache entry is equal to the current version 240 of packet filtering rule set 220. If so, method 400 may proceed to block 440, described in detail below. Otherwise, if the version identifier for the matching cache entry is not equal to current version 240, method 400 may proceed to block 430.

In block 430, packet processor 215 may determine whether the difference between current version 240 and the version identifier for the matching cache entry is greater than n, where n is the total number of entries available in version memory 230. If so, packet processor 215 may determine that the version identifier from the cache entry is outdated and that version memory 230 no longer has valid data regarding the identified version. Accordingly, packet processor 215 may ignore the cache entry and determine an updated result using packet filtering rule set 220, as described below in connection with block 450 of FIG. 4B.

Alternatively, when the difference between current version 240 and the version identifier in the cache entry is less than or equal to n, method 400 may proceed to block 435. In block 435, packet processor 215 may first determine the rule identifier for packet 202 from the matching cache entry. Packet processor 215 may then determine the version identifier for packet 202 from the cache entry and access version memory 230 using this version identifier. In response, packet processor 215 may receive a rule identifier representing a highest priority rule modified for the corresponding version of packet filtering rule set 220. Packet processor 215 may then determine whether the rule identifier for the cache entry is of a higher priority than the highest priority rule accessed from version memory 230. If so, method 400 may proceed to block 440 and may otherwise proceed to block 450, described below in connection with FIG. 4B.

In block 440, packet processor 215 may perform the action identified in the matching cache entry. For example, when the cached result indicates that the packet 202 should be forwarded, packet processor 215 may instruct transmitter 235 to transmit the packet to an appropriate destination. Otherwise, packet processor 215 may perform no further action, such that packet 202 is dropped. Method 400 may then proceed to block 445, where method 400 may stop.

Referring now to FIG. 4B, method 400 may reach block 450 in situations in which network node 200 cannot locate a cached result for packet 202 or when network node 200 otherwise determines that the cached result should not be applied. Accordingly, in block 450, packet processor 215 may access packet filtering rule set 220 to identify a highest priority rule with a matching key pattern and also determine an identified action for packet 202. Packet processor 215 may then apply the determined action to packet 202.

To save processing time upon receipt of subsequent packets belonging to the same flow as packet 202, packet processor 215 may also generate a new cache entry for packet 202. Accordingly, method 400 may proceed to block 455, where packet processor 215 may locate an available entry in cache 225. In blocks 460, 465, 470, and 475, packet processor 215 may insert the cached result for packet 202 into the located cache entry. In particular, in block 460, packet processor 215 may set the key of the cache entry to the determined key for packet 202. In block 465, packet processor 215 may set the action stored in the cache entry to the action included in the matching rule in filtering rule set 220. In block 470, packet processor 215 may set the rule identifier of the cache entry to the identifier of the matching rule. Finally, in block 475, packet processor 215 may set the version identifier of the cache entry to current version 240. After generating the new cache entry for packet 202, method 400 may proceed to block 480, where method 400 may stop.

Figure 5:
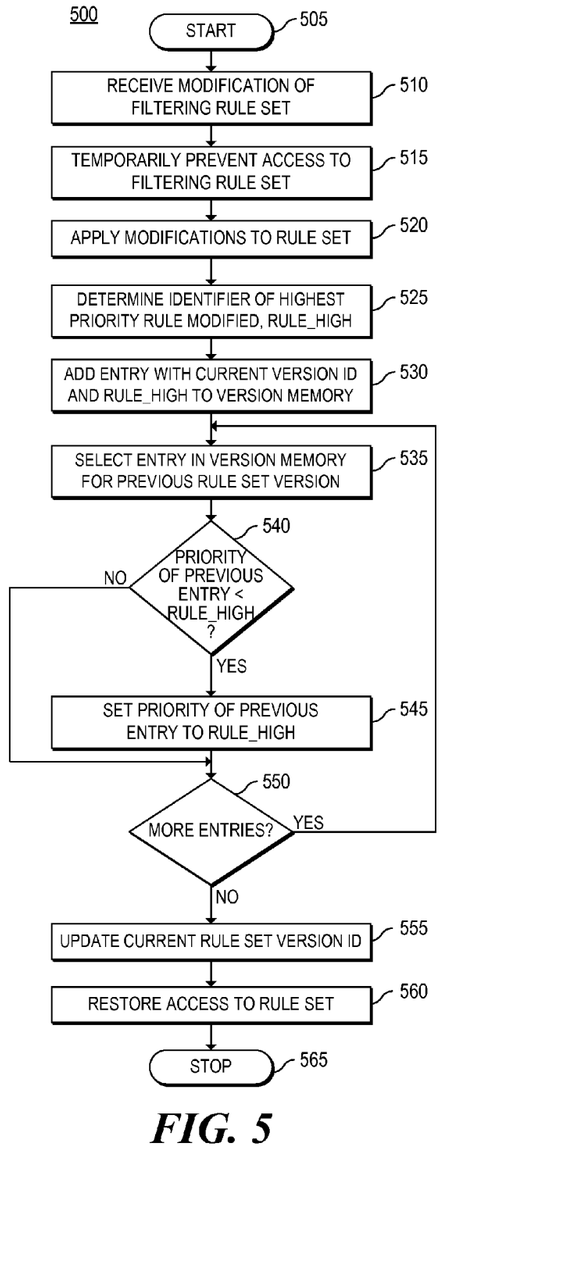
FIG. 5 is a flowchart of an example method for updating a version memory that maintains a highest priority rule modified for each version of a packet filtering rule set.

FIG. 5 is a flowchart of an example method 500 for updating a version memory 230 that maintains a highest priority rule modified for each version of a packet filtering rule set 220. Although execution of method 500 is described below with reference to the components of network node 200, other suitable components for execution of method 500 will be apparent to those of skill in the art. Method 500 may be implemented in the form of executable instructions stored on a machine-readable storage medium and/or in the form of electronic circuitry.

Method 500 may start in block 505 and proceed to block 510, where rule set update engine 245 may receive a modification of packet filtering rule set 220, which may include insertion of one or more new rules or modification of one or more existing rules. Method 500 may then proceed to block 515, where rule set update engine 245 may temporarily block access to packet filtering rule set 220 and version memory 230 by, for example, setting a flag used to permit access to false. Method 500 may then proceed to block 520, where rule set update engine 245 may apply the modifications to packet filtering rule set 220.

After updating packet filtering rule set 220, method 500 may then proceed to block 525, where rule set update engine 245 may determine the identifier of the highest priority rule modified for the new version of packet filtering rule set 220, rule_high. Next, method 500 may proceed to block 530, where rule set update engine 245 may create a new entry in version memory 230 including current version 240 and the identifier of the highest priority rule, as determined in block 525.

Next, based on repeated execution of blocks 535, 540, 545, and 550, rule set update engine 245 may update the highest priority rule stored in version memory 230 for each corresponding version such that no value in version memory 230 identifies a rule of a lower priority than the highest priority rule modified for the new version. Thus, in block 535, rule set update engine 245 may select a next entry in version memory 230 corresponding to a previous version of packet filtering rule set 220. Method 500 may then proceed to block 540, where rule set update engine 245 may determine whether the priority of the rule identifier stored for the entry in version memory 230 is less than rule_high. If so, method 500 may proceed to block 545, where rule set update engine 245 may set the selected entry in version memory 230 to rule_high. Method 500 may then proceed to block 550. Alternatively, when, in block 540, rule set update engine 245 determines that the priority of the rule identifier for the selected entry in version memory 230 is greater than or equal to rule_high, method 500 may skip directly to block 550.

In block 550, rule set update engine 245 may determine whether there are additional entries in version memory 230 to be processed. If so, method 500 may return to block 535 for processing of the next entry. Otherwise, method 500 may proceed to block 555, where rule set update engine 245 may update current version 240 by incrementing or otherwise increasing the stored value. Method 500 may then proceed to block 560, where rule set update engine 245 may restore access to packet filtering rule set 220 and version memory 230 by, for example, setting the flag used to permit access to true. Finally, method 500 may proceed to block 565, where method 500 may stop.

Figure 6:
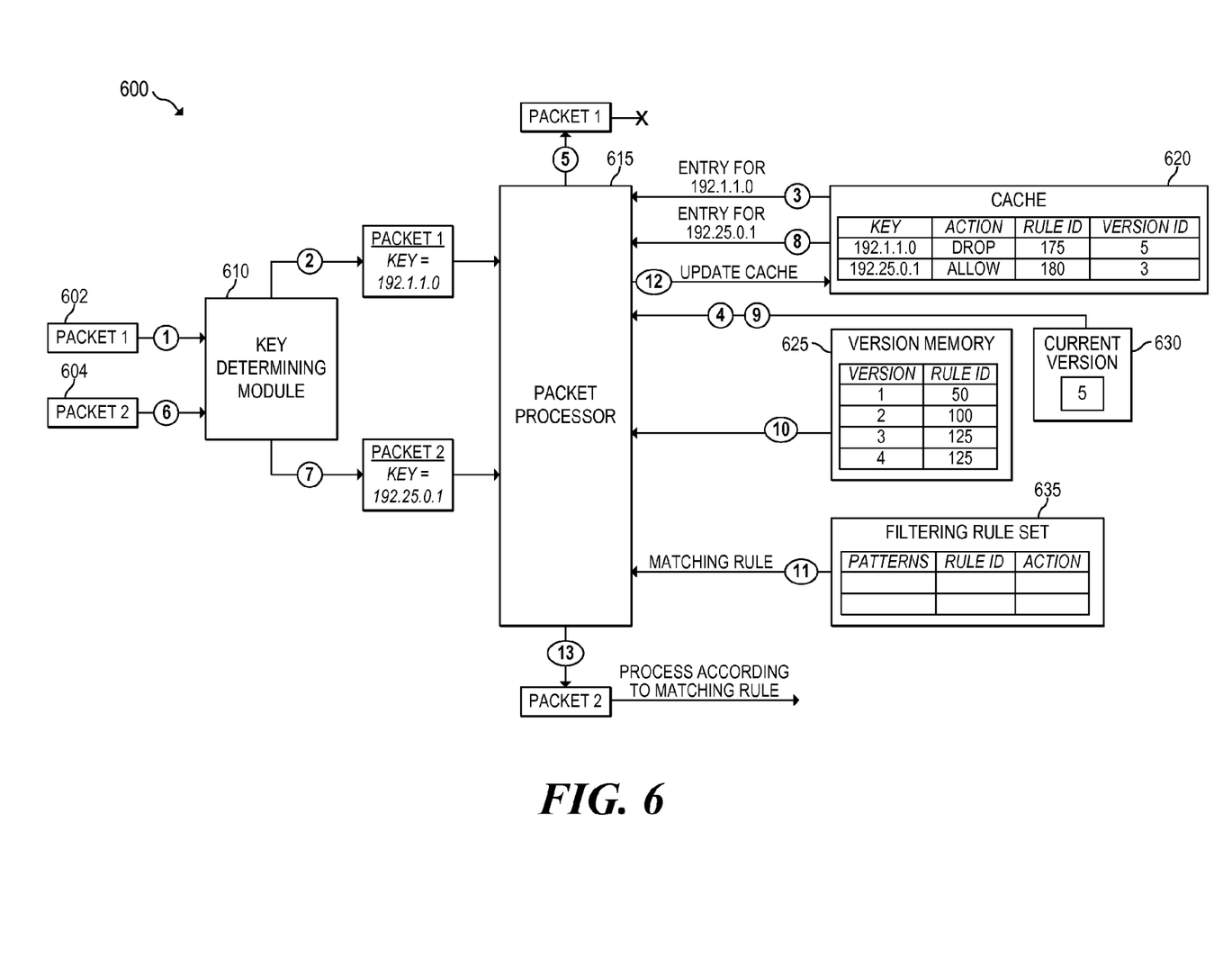
FIG. 6 is an example operation flow illustrating the processing of two packets using a packet filtering cache, a version memory, a current version identifier, and a packet filtering rule set.

FIG. 6 is an example operation flow 600 illustrating the processing of two packets 602, 604 using components of a network node, including a key determining module 610, a packet processor 615, a packet filtering cache 620, a version memory 625, a current version identifier 630, and a packet filtering rule set 635. The components illustrated in FIG. 6 may correspond, for example, to the components of network node 200 of FIG. 2.

Operation flow 600 may start in block 1, where the network node may receive a first packet 602. In response, in block 2, key determining module 610 may determine a key for first packet 602 as one or more fields of first packet 602, which, in this case, results in a determined key of "192.1.1.0," which is the source IP address of the packet. It should be noted that, in some embodiments, key determining module 610 may extract multiple fields from packet 602.

In block 3, packet processor 615 may retrieve the entry in cache 620 corresponding to the determined key, which, as illustrated, has an action of "Drop," a rule identifier of "175," and a version identifier of "5." In block 4, packet processor 615 may access current version 630 ("5" in this case). Accordingly, because the current version 630 is equal to the version identifier of the matching entry in cache 620, packet processor 615 may take the cached action and therefore drop packet 602.

In block 6, the network node may receive a second packet 604. In response, in block 7, key determining module 610 may determine a key for second packet 604 as one or more fields of the packet 604, which results in a determined key of "192.25.0.1," which is the source IP address of the packet. In block 8, packet processor may retrieve the entry in cache 620 corresponding to the determined key, which, as illustrated, has an action of "Allow," a rule identifier of 180, and a version identifier of "3." In block 9, packet processor 615 may access current version 630 ("5" in this case) and determine that current version 630 is not equal to the version identifier included in the cached entry.

Accordingly, in block 10, packet processor 615 may access version memory to determine the highest priority rule modified for version 3 of packet filtering rule 635, which, as illustrated, is "125." Packet processor 615 may determine that, because the rule identifier of the matching entry ("180") is of a lower priority than "125," that it should determine a matching rule for second packet 604 using packet filtering rule set 635. Accordingly, in block 11, packet processor 615 may determine a rule with a matching key pattern in rule set 635 and, in block 12, replace the current entry in cache 620 with the details of the matching rule (not shown). Finally, in block 13, packet processor 615 may process second packet 604 according to the matching rule received in block 11.

According to the foregoing, example embodiments disclosed herein increase performance of a network node that implements packet filtering. In particular, example embodiments provide for application of cached packet filtering rules in a manner that minimizes processing performed to update cached results of a packet filtering rule set, while still ensuring that a most recent packet filtering decision is applied to each packet.

We claim:

1. A network node for selective invalidation of packet filtering cache results based on rule priority, the network node comprising:
   a cache of results of a packet filtering rule set to store a plurality of entries, each cache entry including a rule identifier of a packet filtering rule to which the cache entry relates and a rule set version identifier that identifies a version of the packet filtering rule set when the cache entry was created;
   a version memory to store a highest priority rule modified for each of a plurality of rule set version identifiers;
   a current rule set version identifier identifying a current version of the packet filtering rule set; and
   a packet processor to:
   determine, when a cache entry corresponding to a received packet is included in the cache, whether the rule identifier included in the cache entry is of a higher priority than a highest priority rule stored in the version memory for the rule set version identifier included in the cache entry, and
   apply, to the packet, an action included in the cache entry when the rule identifier included in the cache entry is of a higher priority.

2. The network node of claim 1, wherein the packet filtering rule set includes a plurality of rules associated with a priority and, for each rule, a corresponding action to be taken when the packet matches the rule.

3. The network node of claim 1, wherein the packet processor is further configured to:
   determine whether the rule set version identifier included in the cache entry is equal to the current rule set version identifier; and
   apply the action included in the cache entry to the packet when the rule set version identifier included in the cache entry is equal to the current rule set version identifier.

4. The network node of claim 3, wherein:
   the version memory stores a total of n entries, and
   the packet processor ignores the cache entry when the current rule set version identifier minus the rule set version identifier included in the cache entry is greater than n.

5. The network node of claim 1, wherein the packet processor is further configured to, when a cache entry corresponding to the packet is not included in the cache or the rule identifier included in the cache entry is of an equal or lower priority:
   access the packet filtering rule set to identify a matching rule and a corresponding action for the packet;
   locate an available entry in the cache; and
   insert a cached result for the packet into the available entry in the cache, the cached result including a key for the packet, the corresponding action, an identifier of the matching rule, and the current rule set version identifier.

6. The network node of claim 1, further comprising a rule set update engine to:
   apply at least one modification of the packet filtering rule set to update the packet filtering rule set to a new version;
   determine an identifier of a highest priority rule modified for the new version;
   update the version memory to set the highest priority rule to the highest priority rule modified for the new version for each entry in the version memory for which the highest priority rule is of a lower priority than the highest priority rule modified for the new version; and update the current rule set version identifier.

7. The network node of claim 1, wherein:
the plurality of rules in the packet filtering rule set are ordered from a highest priority rule to a lowest priority rule based on an integer rule identifier assigned to each rule, and the packet processor determines that the rule identifier included in the cache entry is of a higher priority than the highest priority rule stored in the version memory when the rule identifier is less than the highest priority rule.

8. A machine-readable storage medium device encoded with instructions executable by a processor of a network node for selective invalidation of packet filtering cache results based on rule priority, the machine-readable storage medium comprising:
instructions for identifying a cache entry of a cache of results of a packet filtering rule set, the identified entry including a key corresponding to a determined key of a received packet;

instructions for determining whether a rule set version identifier included in the cache entry matches a current version of the packet filtering rule set;

instructions for determining whether a rule identifier included in the cache entry is of a higher priority than a highest priority rule modified for a version of the packet filtering rule set identified by the rule set version identifier included in the cache entry; and instructions for processing the packet according to an action identified by the cache entry when either the rule set version identifier matches or the rule identifier is of a higher priority.

9. The machine-readable storage medium of claim 8, further comprising instructions for updating the cache when the rule set version identifier does not match the current version and when the rule identifier included in the cache entry is of an equal or lower priority, the instructions for updating comprising:
instructions for accessing the packet filtering rule set to identify a matching rule and a matching action for the packet;

instructions for inserting a cached result for the packet into an available entry in the cache, the cached result including the key for the packet, the matching action, an identifier of the matching rule, and the current version of the packet filtering rule set.

10. The machine-readable storage medium of claim 8, further comprising instructions for updating the packet filtering rule set to a new version, the instructions for updating comprising:
instructions for updating the current version of the packet filtering rule set;

instructions for determining an identifier of a highest priority rule modified for the new version; and instructions for updating a value storing a highest priority rule associated with each version of the packet filtering rule set such that no value identifies a rule of a lower priority than the highest priority rule modified for the new version.

11. A method for selectively invalidating packet filtering cache results based on rule priority, the method comprising:

receiving a packet in a network node;

determining, by the network node, whether a key for the packet is located in a cache of results of a packet filtering rule set, the cache including a plurality of keys, each associated with a corresponding action, a corresponding rule identifier, and a corresponding rule set version identifier;

determining, when the key for the packet is included in the cache, whether the corresponding rule identifier is of a higher priority than a highest priority rule modified for the corresponding rule set version identifier; and applying the corresponding action to the packet when the corresponding rule identifier is of a higher priority.

12. The method of claim 11, wherein determining whether the corresponding rule identifier is of a higher priority comprises:
accessing the rule identifier corresponding to the key for the packet from the cache;

accessing the highest priority rule modified for the corresponding rule set version identifier from a version memory, the version memory storing a plurality of entries including a highest priority rule modified for each of a plurality of rule set version identifiers; and determining whether the corresponding rule identifier accessed from the cache is of a higher priority than the highest priority rule accessed from the version memory.

13. The method of claim 12, further comprising updating the packet filtering rule set to a new version, the updating comprising:
updating a current rule set version identifier;

determining an identifier of a highest priority rule modified for the new version; and updating the version memory to set the highest priority rule to the highest priority rule modified for the new version for each entry in the version memory for which the highest priority rule is of a lower priority than the highest priority rule modified for the new version.

14. The method of claim 11, further comprising, prior to determining whether the corresponding rule identifier is of a higher priority:
determining whether the corresponding rule set version identifier is equal to a current rule set version identifier; and applying the corresponding action to the packet when the corresponding rule set version identifier is equal to the current rule set version identifier.

15. The method of claim 11, further comprising, when the key for the packet is not located in the cache and the corresponding rule identifier is of an equal or lower priority than the highest priority rule modified for the corresponding rule set version identifier:
accessing the packet filtering rule set to identify a matching rule and a matching action for the packet;

locating an available entry in the cache; and inserting a cached result for the packet into the available entry in the cache, the cached result including the key for the packet, the matching action, an identifier of the matching rule, and a current rule set version identifier of the packet filtering rule set.

* * * * *